United States Patent
Shimizu et al.

(10) Patent No.: US 8,824,613 B2
(45) Date of Patent: Sep. 2, 2014

(54) SIGNAL TRANSMISSION DEVICE, AND TRANSMISSION CONTROL METHOD

(75) Inventors: Tatsuo Shimizu, Chiba (JP); Takeshi Maeda, Tokyo (JP); Uichiro Omae, Kanagawa (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 13/207,685

(22) Filed: Aug. 11, 2011

(65) Prior Publication Data

US 2012/0045015 A1 Feb. 23, 2012

(30) Foreign Application Priority Data

Aug. 18, 2010 (JP) ................................. 2010-182998

(51) Int. Cl.
  *H04L 7/02* (2006.01)
  *H04L 25/02* (2006.01)
  *G09G 3/36* (2006.01)
  *G09G 3/20* (2006.01)

(52) U.S. Cl.
  CPC .......... *H04L 25/0272* (2013.01); *G09G 3/3611* (2013.01); *G09G 2370/14* (2013.01); *G09G 3/2092* (2013.01)
  USPC ........... 375/360; 375/357; 375/358; 375/364; 375/371; 370/516

(58) Field of Classification Search
  CPC ........... G09G 2370/14; G09G 2370/10; H04L 25/0272; H04L 25/0276; H04L 7/0008
  USPC ......... 375/259, 260, 295, 316, 319, 357, 358, 375/360, 362, 364, 371; 324/98; 455/453, 455/284, 305; 370/284, 301, 516
  See application file for complete search history.

(56) References Cited

U.S. PATENT DOCUMENTS

| | | | | |
|---|---|---|---|---|
| 5,631,757 A * | 5/1997 | Bodeep et al. | ............... | 398/138 |
| 6,625,206 B1 * | 9/2003 | Doblar | .......... | 375/219 |
| 6,754,841 B2 * | 6/2004 | Yang | ............. | 713/503 |
| 6,930,513 B2 * | 8/2005 | Kim et al. | ........ | 326/60 |
| 7,102,545 B2 * | 9/2006 | Choi | ............ | 341/56 |
| 7,516,029 B2 * | 4/2009 | Kim et al. | ........ | 702/69 |
| 7,627,044 B2 * | 12/2009 | Kim et al. | ........ | 375/257 |
| 8,363,748 B2 * | 1/2013 | Takeuchi | ........ | 375/295 |
| 2009/0132741 A1 * | 5/2009 | Kim et al. | ........ | 710/104 |
| 2010/0129073 A1 * | 5/2010 | Hamana et al. | ............. | 398/25 |
| 2011/0038249 A1 * | 2/2011 | Tamaki et al. | ............. | 370/210 |

FOREIGN PATENT DOCUMENTS

| | | |
|---|---|---|
| JP | 60-239141 | 11/1985 |
| JP | 2009-130852 A | 6/2009 |
| JP | 2009-225335 | 10/2009 |

* cited by examiner

*Primary Examiner* — Sophia Vlahos
(74) *Attorney, Agent, or Firm* — Sony Corporation

(57) ABSTRACT

There is provided a signal transmission device including a first communication module including a first signal transmission unit for transmitting a first transmission signal having first amplitude to a second communication module through a predetermined transmission path, and the second communication module including a second signal transmission unit for transmitting a second transmission signal having second amplitude different from the first amplitude to the first communication module through the predetermined transmission path, and a transmission timing adjustment unit for adjusting a transmission timing of the second transmission signal by the second signal transmission unit so that a transition timing of the first transmission signal transmitted from the first communication module and a transition timing of the second transmission signal coincide with each other at a receiving end of the first communication module.

13 Claims, 14 Drawing Sheets

21 : MASTER MODULE
23 : SLAVE MODULE
22 : TRANSMISSION LINE
211, 236 : DIFFERENTIAL TRANSMISSION CIRCUIT
212, 231 : TERMINATION RESISTOR
213 : MULTILEVEL DIFFERENTIAL RECEPTION CIRCUIT
214, 235 : LATCH CIRCUIT
232 : TWO-LEVEL DIFFERENTIAL RECEPTION CIRCUIT
233 : CDR (CLOCK DATA RECOVERY) CIRCUIT
234 : TIMING ADJUSTMENT CIRCUIT
237 : DELAY TIME DETECTION UNIT
238 : DELAY TIME NOTIFICATION UNIT

FIG.7

| INPUT TO MASTER 11 | INPUT TO SLAVE 13 | OUTPUT OF RECEPTION CIRCUIT 113 | OUTPUT OF RECEPTION CIRCUIT 132 | OUTPUT FROM MASTER 11 | OUTPUT FROM SLAVE 13 |
|---|---|---|---|---|---|
| 0 | 0 | 00 | 0 | 0 | 0 |
| 0 | 1 | 01 | 0 | 1 | 0 |
| 1 | 0 | 10 | 1 | 0 | 1 |
| 1 | 1 | 11 | 1 | 1 | 1 |

SIGNAL TRANSMISSION DEVICE, AND TRANSMISSION CONTROL METHOD

BACKGROUND

The present disclosure relates to a signal transmission device and a transmission control method.

Many portable appliances such as mobile phones and notebook PCs are configured from a main body equipped with operation means to be operated by a user and a display portion equipped with a display device such as an LCD (Liquid Crystal Display). Also, a movable member is used for a hinge portion connecting the main body and the display portion. Normally, power lines and signal lines pass through this hinge portion. Thus, lines passing through the hinge portion are deteriorated according to transformation of the hinge portion. Accordingly, a refinement for preventing deterioration in the lines passing through the hinge portion occurring at the time of transformation of the hinge portion is desired.

To suppress deterioration occurring in the lines passing through the hinge portion, first, it is important to reduce the number of the lines passing through the hinge portion. Until now, a parallel transmission scheme was used in many cases for data transmission from the main body to the display portion. In the case of adopting the parallel transmission scheme, several tens of signal lines are to pass through the hinge portion to transmit image data to be displayed on the display device. Thus, there were risks that signal lines would be twisted due to the transformation of the hinge portion, and that the power lines and the signal lines would break. Accordingly, as a data transmission scheme for replacing the parallel transmission scheme, a serial transmission scheme capable of transmitting the image data by about one line was devised (for example, see JP H60-239141A).

Additionally, the direction of transmission of data in a portable appliance is not limited to the direction from the main body to the display portion. For example, besides the display device, the display portion is equipped with an antenna for communication, various types of switches and the like, and thus, a received signal received by the antenna, a control signal output from a switch or the like is transmitted to the main body. Accordingly, a scheme for performing full-duplex bidirectional transmission in the serial transmission scheme or the like is devised (for example, see JP 2009-130852A and JP 2009-225335A). For example, a scheme is considered of transmitting signals by differentiating the amplitude of a signal transmitted from the display portion to the main body and the amplitude of a signal transmitted from the main body to the display portion and causing the transition timings of the signals to coincide with each other.

SUMMARY

If the serial transmission scheme as described above is adopted, the degree of freedom of the hinge portion's transformation is increased, and the design of the portable appliance can be improved. Furthermore, the number of lines is reduced and resistance to twisting and the like is improved, and thus reliability of the lines passing through the hinge portion is improved. However, in the case of the serial transmission scheme, since the amount of data transmitted per clock is reduced compared to the parallel transmission scheme, a high-speed clock has to be used to obtain the same data transmission rate. Particularly, a recent mobile terminal is equipped with an LCD with high resolution, and an extremely high speed clock has to be used to serially transmit image data to be displayed on the LCD.

When the data transmission rate is increased in the case of performing full-duplex bidirectional transmission, a significant discrepancy occurs, due to delay occurring in the transmission line, between the transition timing of a signal transmitted from the main body to the display portion and the transition timing of a signal transmitted from the display portion to the main body. When the discrepancy between the transition timings increases, a timing margin which corresponds to a period where the amplitude of a signal can be accurately detected is reduced, and the detection accuracy of a signal amplitude is reduced.

In light of the foregoing, it is desirable to provide a signal transmission device and a transmission control method which are novel and improved, and which are capable of performing full-duplex bidirectional transmission at a higher rate by maintaining a sufficient timing margin.

According to an embodiment of the present disclosure, there is provided a signal transmission device which includes a first communication module including a first signal transmission unit for transmitting a first transmission signal having first amplitude to a second communication module through a predetermined transmission path, and the second communication module including a second signal transmission unit for transmitting a second transmission signal having second amplitude different from the first amplitude to the first communication module through the predetermined transmission path, and a transmission timing adjustment unit for adjusting a transmission timing of the second transmission signal by the second signal transmission unit so that a transition timing of the first transmission signal transmitted from the first communication module and a transition timing of the second transmission signal coincide with each other at a receiving end of the first communication module.

The transmission timing adjustment unit may adjust the transmission timing of the second transmission signal by an amount of delay time occurring at a time of transmitting a signal through the predetermined transmission path.

The first communication module may further include a signal generation unit for generating the first transmission signal having a waveform obtained by superimposing a clock on a data signal generated from transmission data. Furthermore, the second communication module may further include a clock extraction unit for extracting the clock from the first transmission signal transmitted from the first communication module. In this case, the second signal transmission unit transmits the second transmission signal by using the clock extracted by the clock extraction unit.

The second signal transmission unit may transmit the second transmission signal having second amplitude that is smaller than the first amplitude to the first communication module.

The first communication module may further include a delay time detection unit for detecting, from a difference between the transition timing of the second transmission signal transmitted from the second communication module and the transition timing of the first transmission signal, a delay time occurring at a time of transmitting a signal through the predetermined transmission path, and a delay time notification unit for notifying the second communication module of the delay time detected by the delay time detection unit. In this case, the transmission timing adjustment unit adjusts the transmission timing of the second transmission signal based on the delay time notified by the delay time notification unit.

The second communication module may further include a training signal transmission unit for transmitting a known training signal to the first communication module through the predetermined transmission path. In this case, the delay time detection unit detects the delay time occurring at the time of transmitting a signal through the predetermined transmission path, by scanning transmission timings of the known training signal transmitted by the training signal transmission unit.

The signal transmission device may further include an arithmetic processing unit for outputting image data, and a display unit for displaying the image data. In this case, the first signal transmission unit transmits, to the second communication module, the first transmission signal obtained by modulating the image data output from the arithmetic processing unit, and the display unit displays image data obtained by demodulating the first transmission signal transmitted from the first communication module to the second communication module through the predetermined transmission path.

According to another embodiment of the present disclosure, there is provided a transmission control method which includes transmitting, by a first communication module, a first transmission signal having first amplitude to a second communication module through a predetermined transmission path, and transmitting, by the second communication module, a second transmission signal having second amplitude different from the first amplitude to the first communication module through the predetermined transmission path. The second communication module adjusts a transmission timing of the second transmission signal so that a transition timing of the first transmission signal transmitted from the first communication module and a transition timing of the second transmission signal coincide with each other at a receiving end of the first communication module.

According to the embodiments of the present disclosure described above, it is possible to perform full-duplex bidirectional transmission at a higher rate by maintaining a sufficient timing margin.

BRIEF DESCRIPTION OF THE DRAWINGS

FIG. 7 is an explanatory diagram for describing a relationship between data transmitted by both modules, signal amplitudes detected by both modules and data received by both modules;

DETAILED DESCRIPTION OF THE EMBODIMENT(S)

Figure 1:
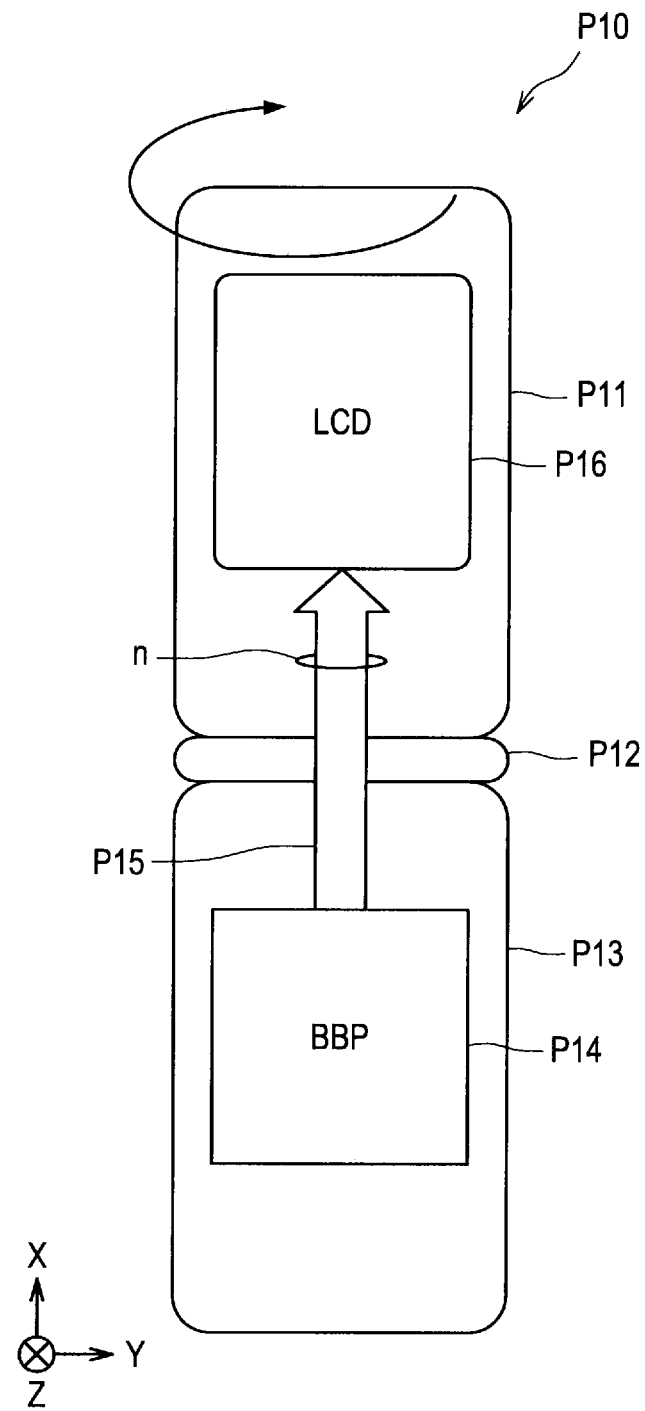
FIG. 1 is an explanatory diagram for describing a configuration of a mobile terminal adopting a parallel transmission scheme.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

[Flow of Explanation]

The flow of explanation on an embodiment of the present disclosure which will be described below will be briefly stated here. First, a configuration of a mobile terminal P10 adopting a parallel transmission scheme will be described. Next, a configuration of a mobile terminal P20 adopting a serial transmission scheme will be described with reference to FIG. 2. Then, a module configuration capable of full-duplex bidirectional transmission will be described with reference to FIG. 3. At this point, waveforms of signals that are observed in a transmission line when full-duplex bidirectional transmission is performed, and the like, will be considered with reference to FIGS. 4 to 7.

Next, configurations of a master module 21 and a slave module 23 capable of realizing full-duplex bidirectional transmission according to the embodiment will be described with reference to FIG. 8. Then, issues arising when transmission delay in a transmission line 22 is not taken into account will be considered with reference to FIGS. 9 to 13. Then, a full-duplex bidirectional transmission method that takes the transmission delay in the transmission line 22 into account, and an effect obtained by applying the method will be described with reference to FIGS. 14 to 16. Lastly, technical ideas of the embodiment will be summarized and effects obtained by the technical ideas will be briefly described.

(Description Items)

1: Introduction
   1-1: Configuration of Mobile Terminal P10 according to Parallel Transmission Scheme
   1-2: Configuration of Mobile Terminal P20 according to Serial Transmission Scheme
   1-3: Full-Duplex Bidirectional Transmission
2: Embodiment
   2-1: Module Configuration
   2-2: Influence of Transmission Delay
   2-3: Mechanism for Avoiding Influence of Transmission Delay
   2-4: Supplement 3: Summary <1: Introduction>

First, brief overviews of a parallel transmission scheme which has been widely used until now as the data transmission scheme inside an appliance and a serial transmission scheme which will be widely used in the future will be given taking device configurations of mobile terminals P10 and 130 adopting the respective schemes as examples.

[1-1: Configuration of Mobile Terminal P10 according to Parallel Transmission Scheme]

First, a device configuration of a mobile terminal P10 adopting the parallel transmission scheme will be briefly described with reference to FIG. 1. FIG. 1 is an explanatory diagram showing an example of a device configuration of the mobile terminal P10 adopting the parallel transmission scheme. FIG. 1 schematically illustrates a mobile phone as an example of the mobile terminal P10. However, the application scope of the technology described below is not limited to mobile phones. For example, it can also be applied to information processing apparatuses such as notebook PCs and various portable electronic appliances.

As shown in FIG. 1, the mobile terminal P10 mainly includes a display unit P11, a connecting unit P12, an operation unit P13, a baseband processor P14 (BBP), a parallel signal path P15 and a liquid crystal unit P16 (LCD). The LCD is an abbreviation for Liquid Crystal Display. Additionally, the display unit P11 and the operation unit P13 may be respectively referred to as a display side and a main body side. Additionally, for the sake of explanation, a case where an image signal is transmitted through the parallel signal path P15 will be described as an example. Of course, the type of a signal to be transmitted through the parallel signal path P15 is not limited to such, and it may also be a control signal, an audio signal, or the like, for example.

As shown in FIG. 1, the liquid crystal unit P16 is provided on the display unit P11. First, an image signal transmitted through the parallel signal path P15 is input to the liquid crystal unit P16. Then, the liquid crystal unit P16 displays an image based on the input image signal. Also, the connecting unit P12 is a member connecting the display unit P11 and the operation unit P13. The connecting member forming this connecting unit P12 has a structure that enables the display unit P11 to rotate 180 degrees in a Z-Y plane, for example. The connecting member can also be formed such that the display unit P11 can rotate in an X-Z plane. In this case, the mobile terminal P10 has a structure capable of folding. Additionally, the connecting member may also have a structure that allows the display unit P11 to move freely in any direction.

The baseband processor P14 is an arithmetic processing unit that provides the mobile terminal P10 with a communication control function and an application execution function. A parallel signal that is output from the baseband processor P14 is transmitted through the parallel signal path P15 to the liquid crystal unit P16 of the display unit P11. The parallel signal path P15 is provided with a large number of signal lines. For example, in the case of a mobile phone, the number n of the signal lines is approximately fifty lines. Also, the parallel signal path P15 is wired so as to pass through the connecting unit P12. The image signal transmission rate is approximately 130 Mbps in a case where the resolution of the liquid crystal unit P16 is QVGA.

As described, a large number of signal lines that form the parallel signal path P15 are provided in the connecting unit P12. Accordingly, if the range of movement of the connecting unit P12 is increased, the risk increases that the movement will inflict damage on the parallel signal path P15, resulting in impairment of the reliability of the parallel signal path P15. On the other hand, if the reliability of the parallel signal path P15 is to be maintained, the range of movement of the connecting unit P12 will be restricted, and the design or the functionality of the mobile terminal P10 will be impaired. It is for this reason that the serial transmission scheme described later was devised as a mechanism for improving the degree of freedom of the movable member forming the connection unit P12 and also improving the reliability of the parallel signal path P15.

In the foregoing, a device configuration of the mobile terminal P10 adopting the parallel transmission scheme has been described.

[1-2: Configuration of Mobile Terminal P20 according to Serial Transmission Scheme]

Figure 2:
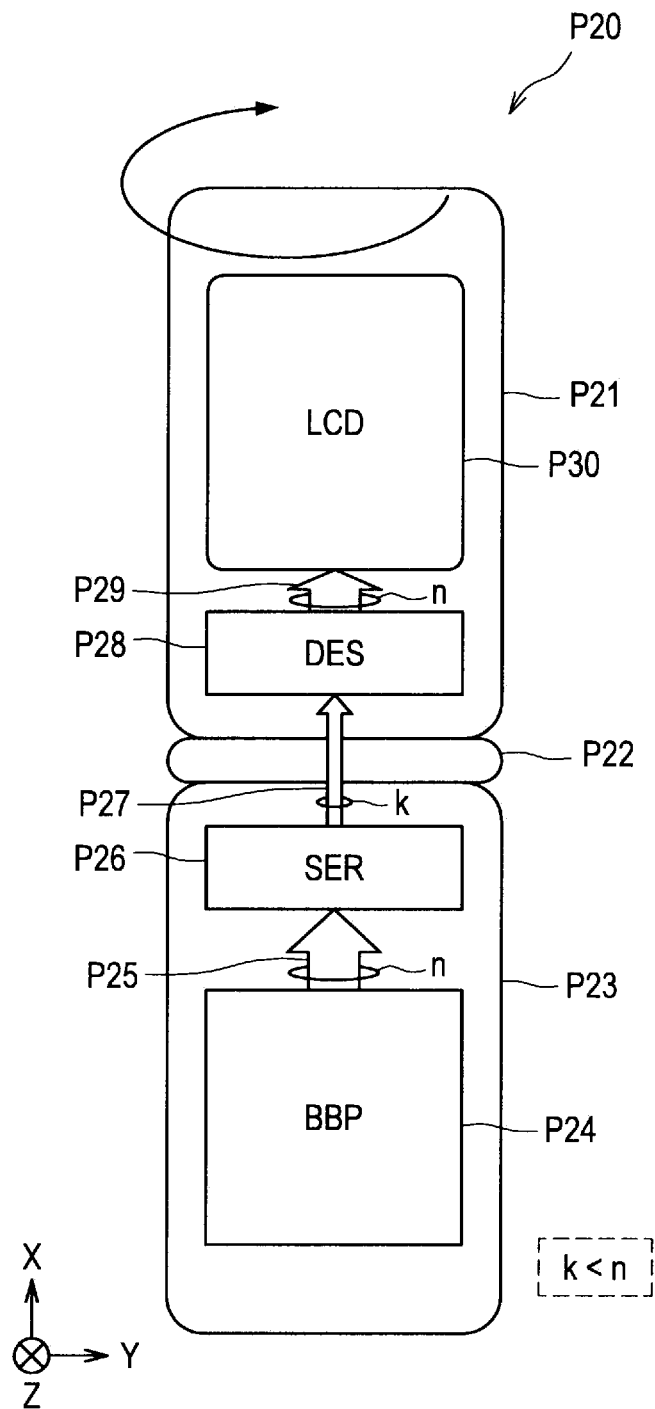
FIG. 2 is an explanatory diagram for describing a configuration of a mobile terminal adopting a serial transmission scheme.

Next, a device configuration of a mobile terminal P20 adopting the serial transmission scheme will be briefly described with reference to FIG. 2. FIG. 2 is an explanatory diagram showing an example of a device configuration of the mobile terminal P20 adopting the serial transmission scheme.

Additionally, FIG. 2 schematically illustrates a mobile phone as an example of the mobile terminal P20. However, the application scope of the technology described below is not limited to mobile phones. For example, it can also be applied to information processing apparatuses such as notebook PCs and various portable electronic appliances.

As shown in FIG. 2, the mobile terminal P20 mainly includes a display unit P21, a connecting unit P22, an operation unit P23 and a liquid crystal unit P30 (LCD). Furthermore, the mobile terminal P20 includes a baseband processor P24 (BBP), parallel signal paths P25 and P29, a serial signal path P27, a serializer P26 and a deserializer P28.

Unlike the mobile terminal P10 that is described above, the mobile terminal P20 transmits an image signal by the serial transmission scheme through the serial signal path P27 that is wired through the connecting unit P22. Therefore, the serializer P26 is provided in the operation unit P23 to serialize the parallel signal that is output from the baseband processor P24. On the other hand, the deserializer P28 is provided in the display unit P21 to parallelize the serial signal that is transmitted through the serial signal path P27.

The serializer P26 converts the parallel signal that is output from the baseband processor P24 and input through the parallel signal path P25 into a serial signal. For example, the serializer P26 serially aligns four signals which have been input in parallel in synchronization with a parallel signal clock (P-CLK) and generates a serial signal that is in synchronization with a serial signal clock (S-CLK) having four times the frequency of the parallel signal clock. The serial signal obtained by the serializer P26 is input to the deserializer P28 through the serial signal path P27.

When the serial signal is input, the deserializer P28 separates each signal from the input serial signal and restores the parallel signal. Then, the deserializer P28 inputs the parallel signal to the liquid crystal unit P30 through the parallel signal path P29. Additionally, the serial signal may be transmitted according to a transmission scheme that uses a differential signal such as a low voltage differential signal (LVDS).

As described, by adopting the serial transmission scheme, the number k of the lines in the serial signal path P27 can be made significantly less than the number n of the lines in the parallel signal path P15 in the mobile terminal P10 in FIG. 1 ($1 \leq k \ll n$). As a result, the movable range of the connecting unit P22 in which the serial signal path P27 passes through can be greatly increased while maintaining the reliability of the serial signal path P27.

In the foregoing, a device configuration of the mobile terminal P20 adopting the serial transmission scheme has been described.

[1-3: Full-Duplex Bidirectional Transmission]

Now, in the above, consideration has been given only to signal transmission from the operation unit P23 to the display unit P21. However, the display unit P21 is equipped with various devices such as image capturing means, a switch or the like and a sensor or the like, and consideration should also be given to signal transmission from the display unit P21 to the operation unit P23. Accordingly, let us consider a mechanism for realizing full-duplex bidirectional transmission in the serial transmission scheme. Additionally, the full-duplex bidirectional transmission means simultaneous transmission of signals from both ends of a transmission path. In the case of the full-duplex bidirectional transmission, signals are transmitted at the same time through the serial signal path P 27 from the operation unit P23 to the display unit P21 and from the display unit P21 to the operation unit P23, for example.

Figure 3:
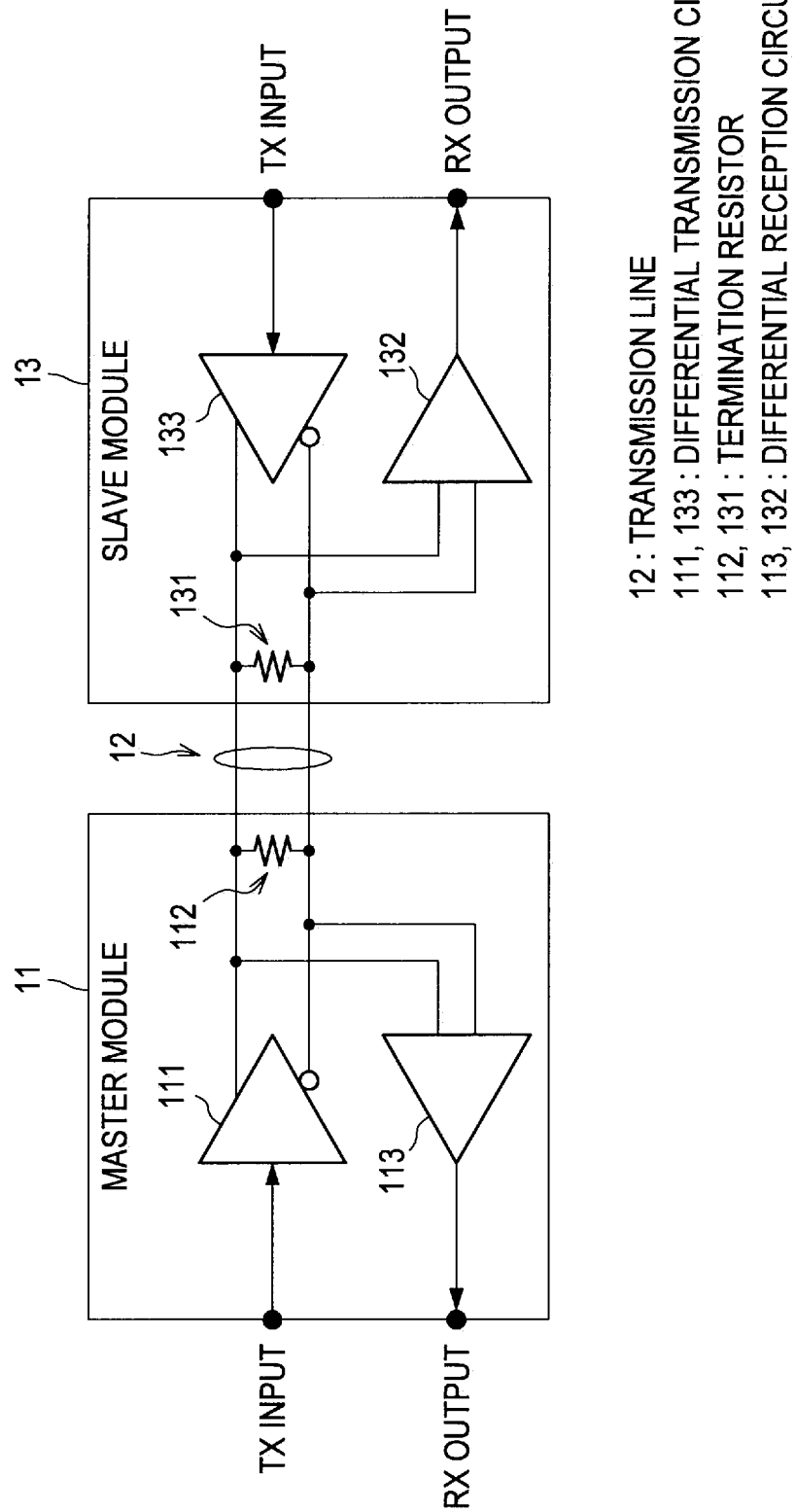
FIG. 3 is an explanatory diagram for describing a module configuration capable of full-duplex bidirectional transmission.

The mechanism of the full-duplex bidirectional transmission is realized by the module configuration as shown in FIG. 3. As shown in FIG. 3, the mobile terminal P20 capable of realizing the full-duplex bidirectional transmission includes a master module 11 and a slave module 13. Furthermore, the master module 11 and the slave module 13 are connected via a transmission line 12. For example, the master module 11 is provided in the operation unit P23 and the slave module 13 is provided in the display unit P21. Also, the transmission line 12 corresponds to the serial signal path P27.

The master module 11 mainly includes a differential transmission circuit 111, a termination resistor 112 and a differential reception circuit 113. On the other hand, the slave module 13 includes a termination resistor 131, a differential reception circuit 132 and a differential transmission circuit 133. Additionally, a case of a differential transmission scheme will be considered as an example.

Figure 4:
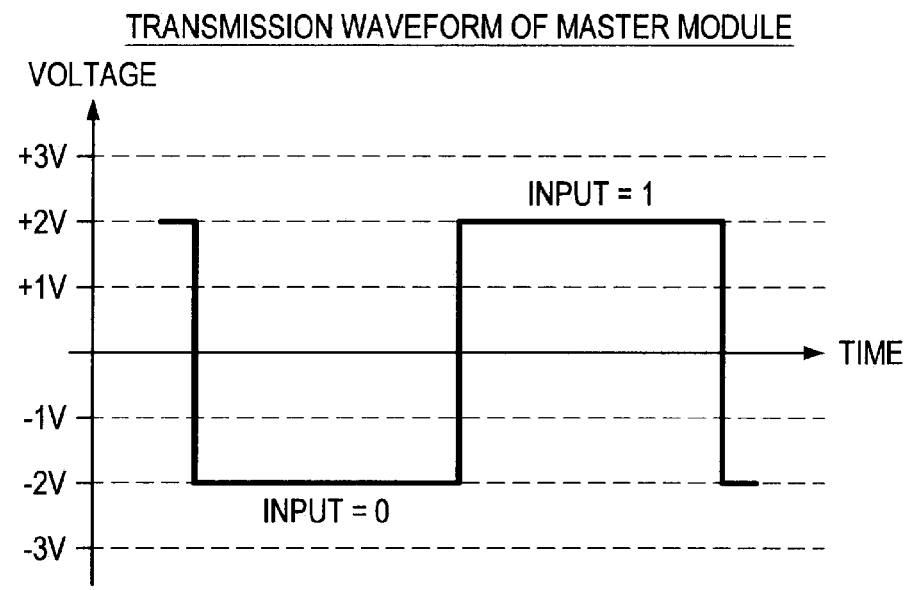
FIG. 4 is an explanatory diagram for describing a waveform of a signal transmitted by a master module.

In the case of transmitting data from the master module 11 to the slave module 13, first, transmission data is input from a TX input (input terminal for transmission data) of the master module 11 to the differential transmission circuit 111. When the transmission data is input, the differential transmission circuit 111 generates, according to the transmission data that is input, a transmission signal having a predetermined first amplitude (for example, ±2V). For example, as shown in FIG. 4, when the transmission data is 1, the differential transmission circuit 111 causes voltage of +2 to occur at both ends of the termination resistor 112, and when the transmission data is 0, the differential transmission circuit 111 causes voltage of −2V to occur at both ends of the termination resistor 112. The transmission signal generated in this manner (hereinafter, first transmission signal) is output from the differential transmission circuit 111 and is transmitted to the slave module 13 through the transmission line 12.

Figure 5:
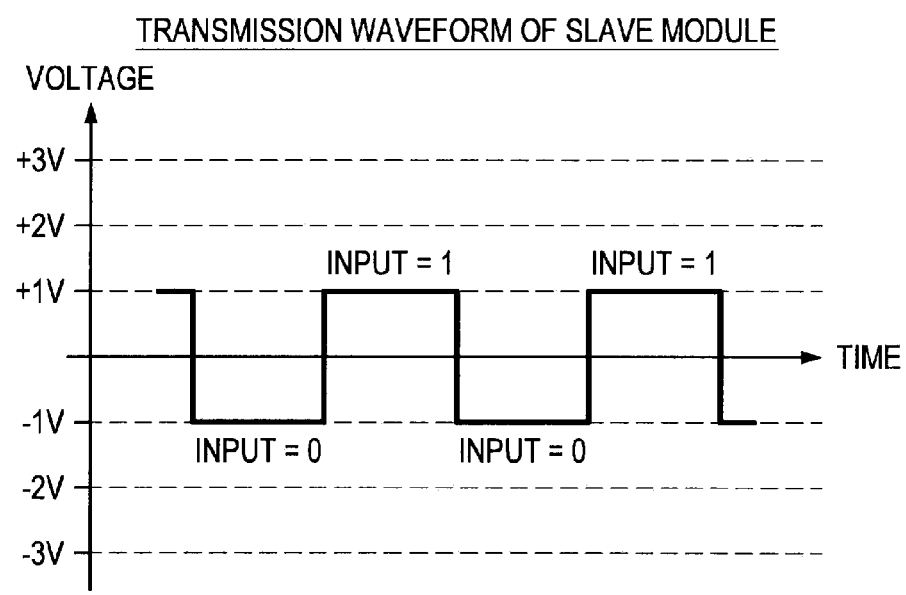
FIG. 5 is an explanatory diagram for describing a waveform of a signal transmitted by a slave module.

In the case of transmitting data from the slave module 13 to the master module 11, first, transmission data is input from a TX input (input terminal for transmission data) of the slave module 13 to the differential transmission circuit 133. When the transmission data is input, the differential transmission circuit 133 generates, according to the transmission data that is input, a transmission signal having a predetermined second amplitude (for example, ±1V). For example, as shown in FIG. 5, when the transmission data is 1, the differential transmission circuit 133 causes voltage of +1V to occur at both ends of the termination resistor 131, and when the transmission data is 0, the differential transmission circuit 133 causes voltage of −1V to occur at both ends of the termination resistor 131. The transmission signal generated in this manner (hereinafter, second transmission signal) is output from the differential transmission circuit 133 and is transmitted to the master module 11 through the transmission line 12.

Figure 6:
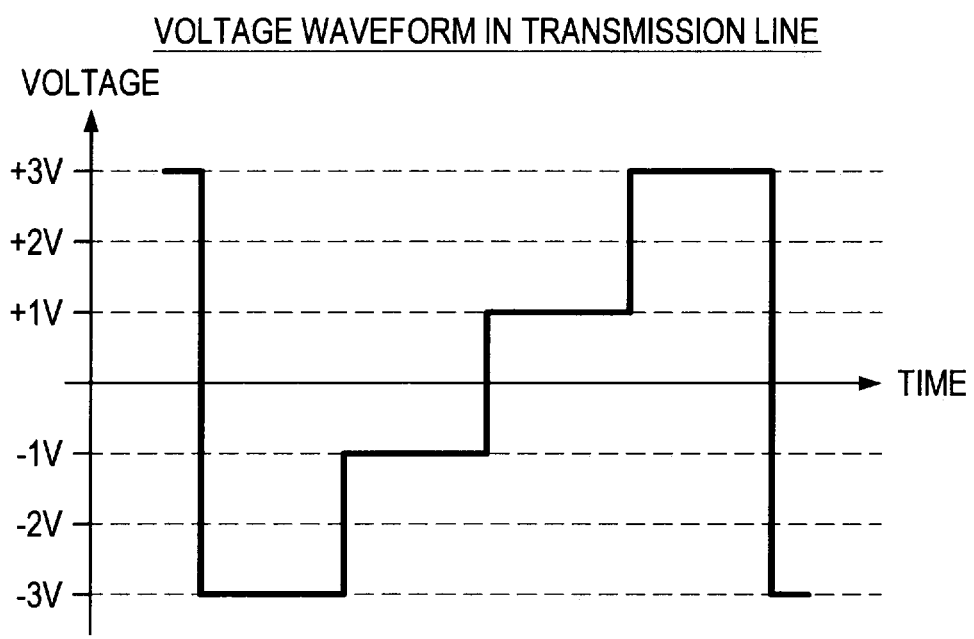
FIG. 6 is an explanatory diagram for describing an ideal signal waveform observed at a transmission line when signals are transmitted by both modules.

As described, when transmission signals are transmitted at the same from the master module 11 to the slave module 13 and from the slave module 13 to the master module 11, the voltage waveform in the transmission line 12 will be as shown in FIG. 6. As shown in FIGS. 4 and 5, the full-duplex bidirectional transmission scheme assumed here is a scheme that uses a signal amplitude different depending on the transmission direction (for example, first amplitude>second amplitude). Accordingly, the superimposed signal of the first transmission signal and the second transmission signal observed in the transmission line 12 will be a multilevel signal as shown in FIG. 6.

Here, a method of separating a component of the first transmission signal and a component of the second transmission signal from the superimposed signal shown in FIG. 6 will be considered.

As described above, the first transmission signal has a voltage amplitude of ±2V. On the other hand, the second transmission signal has a voltage amplitude of ±1V. Accordingly, when the first transmission signal is +2V, the voltage amplitude of the superimposed signal will be +3V or +1V. Also, when the first transmission signal is −2V, the voltage amplitude of the superimposed signal will be −3V or −1V. Furthermore, when the voltage amplitude of the second transmission signal is +1V, the voltage amplitude of the superimposed signal will be +3V or −1V. Furthermore, when the voltage amplitude of the second transmission signal is −1V, the voltage amplitude of the superimposed signal will be −3V or +1V.

Accordingly, if the voltage amplitude of the superimposed signal is larger than 0V, it can be seen that the voltage amplitude of the first transmission signal was +2V. Similarly, if the voltage amplitude of the superimposed signal is smaller than 0V, it can be seen that the voltage amplitude of the first transmission signal was −2V. Therefore, by performing threshold determination on the voltage amplitude of a superimposed signal using a threshold value 0V, the component of the first transmission signal included in the superimposed signal can be separated.

On the other hand, to separate the component of the second transmission signal, threshold determination has to be performed on each of voltage amplitudes +3V, +1V, −1V and −3V of the superimposed signal. If the voltage amplitude of the superimposed signal is larger than +2V, it can be seen that the voltage amplitude of the second transmission signal was +1V. Furthermore, if the voltage amplitude of the superimposed signal is smaller than +2V and larger than 0V, it can be seen that the voltage amplitude of the second transmission signal was −1V.

Similarly, if the voltage amplitude of the superimposed signal is smaller than −2V, it can be seen that the voltage amplitude of the second transmission signal was −1V. Furthermore, if the voltage amplitude of the superimposed signal is larger than −2 and smaller than 0V, it can be seen that the voltage amplitude of the second transmission signal was +1V. Therefore, by performing threshold determination on the voltage amplitude of a superimposed signal using threshold values +2V, 0V and −2V, the component of the second transmission signal included in the superimposed signal can be separated.

A process of separating the component of the first transmission signal and the component of the second transmission signal from the superimposed signal is performed at the master module 11 and the slave module 13 by using the above property.

FIG. 3 will be again referred to. As described above, the first transmission signal transmitted from the master module 11 is superimposed on the second transmission signal at the transmission line 12. On the other hand, the second transmission signal transmitted from the slave module 13 is superimposed on the first transmission signal at the transmission line 12. Accordingly, a superimposed signal as shown in FIG. 6 is input to each of the differential reception circuit 113 of the master module 11 and the differential reception circuit 132 of the slave module 13. Additionally, for the sake of simplicity, it is assumed in the following that the first amplitude is ±2V and the second amplitude is ±1V.

When the superimposed signal is input to the slave module 13, the differential reception circuit 132 performs threshold determination (2-level determination) on the voltage amplitude of the superimposed signal by using a threshold value 0V. If the voltage amplitude of the superimposed signal is larger than 0V, the differential reception circuit 132 determines that the voltage amplitude of the first transmission signal was +2V, and outputs data 1 that corresponds to a case where the voltage amplitude of the first transmission signal is +2V. On the other hand, if the voltage amplitude of superimposed signal is smaller than 0V, the differential reception circuit 132 determines that the voltage amplitude of the first transmission signal was −2V, and outputs data 0 that corresponds to a case where the voltage amplitude of the first transmission signal is −2V. The data output from the differential reception circuit 132 is output from an RX output (output terminal for received data) of the slave module 13 as received data.

On the other hand, when the superimposed signal is input to the master module 11, the differential reception circuit 113 performs threshold determination (4-level determination) on the voltage amplitude of the superimposed signal by using threshold values −2V, 0V and +2V. If the voltage amplitude of the superimposed signal is larger than +2V, the differential reception circuit 113 determines that the voltage amplitude of the second transmission signal was +1V, and outputs data 1 that corresponds to a case where the voltage amplitude of the second transmission signal is +1V. Also, if the voltage amplitude of the superimposed signal is smaller than −2V, the differential reception circuit 113 determines that the voltage amplitude of the second transmission signal was −1V, and outputs data 1 that corresponds to a case where the voltage amplitude of the second transmission signal is −1V.

Furthermore, if the voltage amplitude of the superimposed signal is smaller than +2V and larger than 0V, the differential reception circuit 113 determines that the voltage amplitude of the second transmission signal was −1V, and outputs data 0 that corresponds to a case where the voltage amplitude of the second transmission signal is −1V. Furthermore, if the voltage amplitude of the superimposed signal is larger than −2V and smaller than 0V, the differential reception circuit 113 determines that the voltage amplitude of the second transmission signal was +1V, and outputs data 1 that corresponds to a case where the voltage amplitude of the second transmission signal is +1V. The data output from the differential reception circuit 113 is output from an RX output (output terminal for received data) of the master module 11 as received data.

The relationship between data input from the TX inputs, data output from the differential reception circuits 113 and 132 and data output from the RX outputs is shown in FIG. 7. In the examples of FIGS. 4 to 6, the transmission rate for the first transmission signal was set to half the transmission rate for the second transmission signal. In this case, as shown in FIG. 7, 2-bit data is output from the differential reception circuit 113 during output of 1-bit data from the differential reception circuit 132. Incidentally, in the example of FIG. 7, a configuration is shown where a 2-bit LSB output from the differential reception circuit 113 is adopted as the RX output.

In the foregoing, a mechanism capable of realizing the full-duplex bidirectional transmission has been described. By using this mechanism, it becomes possible to realize the full-duplex bidirectional transmission. Incidentally, the mechanism described above is premised on that the transmission delay of a transmission signal can be ignored. However, in a system with a high data rate, the transmission delay of a transmission signal in the transmission line 12 becomes hard to ignore, and will affect reproduction accuracy of received data. Specifically, due to the discrepancy between the transition timings of two transmission signals caused by transmission delay, the timing margin will be reduced and detection accuracy of signal amplitude will be reduced.

<2: Embodiment>

Accordingly, the present inventors have devised a mechanism of full-duplex bidirectional transmission capable of avoiding reduction in the timing margin caused due to transmission delay. In the following, an embodiment according to the mechanism of this full-duplex bidirectional transmission will be described in detail.

[2-1: Module Configuration]

First, a configuration (module configuration) of a full-duplex bidirectional transmission system according to the present embodiment will be described with reference to FIG. 8. FIG. 8 is an explanatory diagram for describing a configuration (module configuration) of the full-duplex bidirectional transmission according to the present embodiment. Additionally, the mechanism of the full-duplex bidirectional transmission according to the present embodiment can be applied to transmission of data through the serial signal path P27 of the mobile terminal P20 described above.

Figure 8:
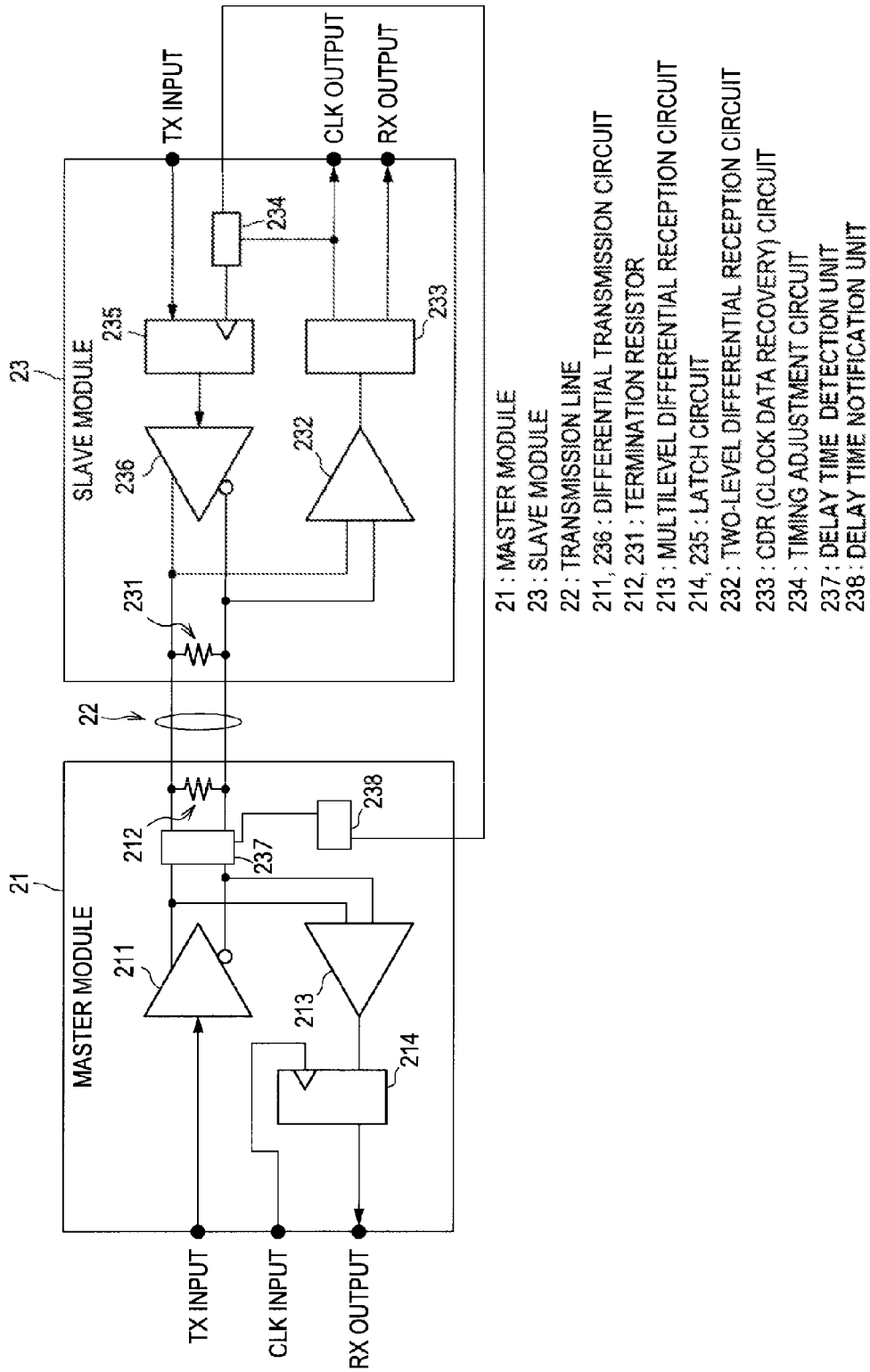
FIG. 8 is an explanatory diagram for describing a module configuration capable of full-duplex bidirectional transmission according to an embodiment of the present disclosure.

As shown in FIG. 8, the full-duplex bidirectional transmission system according to the present embodiment is configured from a master module 21, a transmission line 22 and a slave module 23. Additionally, an explanation will be given here assuming the differential transmission scheme, but application to arbitrary serial transmission scheme is possible. For example, application to a power superimposition scheme that encodes transmission data into a DC-free code and superimposes the code on DC power and then transmits the same via a power cable is also possible.

Now, as shown in FIG. 8, the master module 21 mainly includes a differential transmission circuit 211, a termination resistor 212, a multilevel differential reception circuit 213 a latch circuit 214, and a delay time detection unit 237, and a delay time notification unit 238. On the other hand, the slave module 23 mainly includes a termination resistor 231, a two-level differential reception circuit 232, a CDR circuit 233, a timing adjustment circuit 234, a latch circuit 235, and a differential transmission circuit 236. Additionally, the CDR is an abbreviation for Clock Data Recovery.

In the case of transmitting data from the master module 21 to the slave module 23, first, transmission data is input from a TX input (input terminal for transmission data) of the master module 21 to the differential transmission circuit 211. When the transmission data is input, the differential transmission circuit 211 generates, according to the transmission data that is input, a transmission signal having a predetermined first amplitude (for example, ±200 mV).

Figure 9:
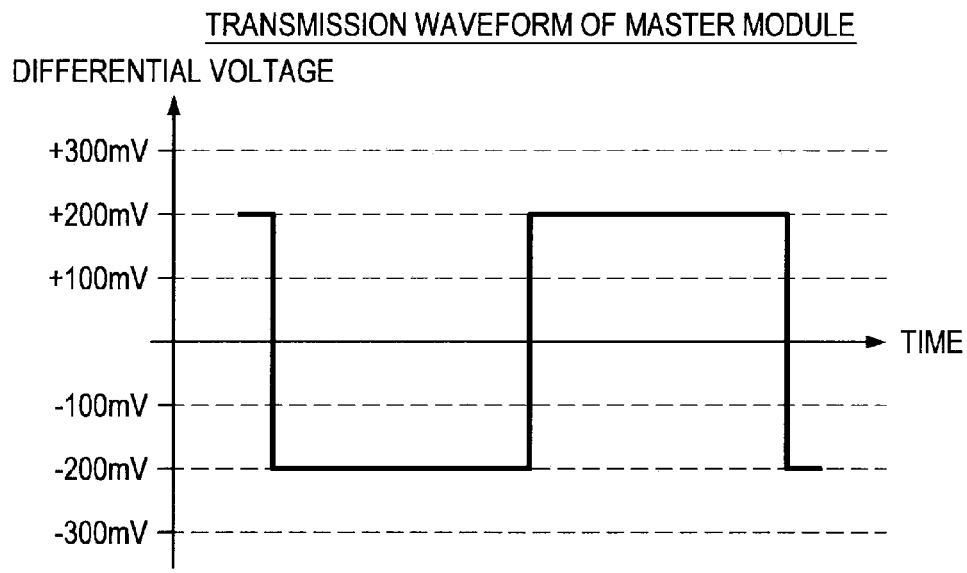
FIG. 9 is an explanatory diagram for describing a waveform of a signal transmitted by a master module according to the embodiment.

For example, as shown in FIG. 9, when the transmission data is 1, the differential transmission circuit 211 causes voltage of +200 mV to occur at both ends of the termination resistor 212, and when the transmission data is 0, the differential transmission circuit 211 causes voltage of −200 mV to occur at both ends of the termination resistor 212. The transmission signal generated in this manner (hereinafter, first transmission signal) is output from the differential transmission circuit 211 and is transmitted to the slave module 23 through the transmission line 22.

In the case of transmitting data from the slave module 23 to the master module 21, first, transmission data is input from a TX input (input terminal for transmission data) of the slave module 23 to the differential transmission circuit 236 via the latch circuit 235. When the transmission data is input, the differential transmission circuit 236 generates, according to the transmission data that is input, a transmission signal having a predetermined second amplitude (for example, ±100 mV).

Figure 10:
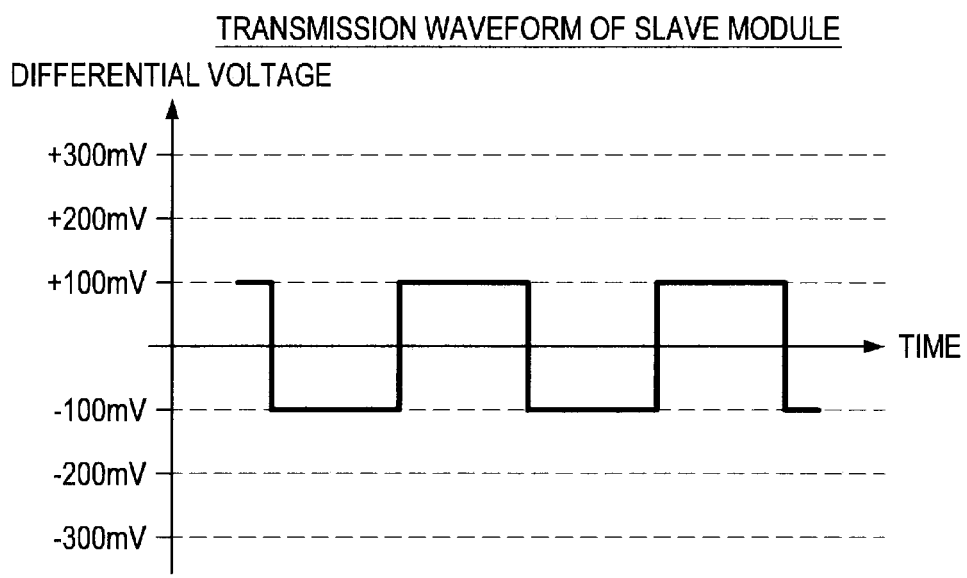
FIG. 10 is an explanatory diagram for describing a waveform of a signal transmitted by a slave module according to the embodiment.

For example, as shown in FIG. 10, when the transmission data is 1, the differential transmission circuit 236 causes voltage of +100 mV to occur at both ends of the termination resistor 231, and when the transmission data is 0, the differential transmission circuit 236 causes voltage of −100 mV to occur at both ends of the termination resistor 231. The transmission signal generated in this manner (hereinafter, second transmission signal) is output from the differential transmission circuit 236 and is transmitted to the master module 21 through the transmission line 22.

For example, if the impedance of the transmission line 22 is 100Ω (in the case of differential transmission) and the impedance of the termination resistors 212 and 231 is 100Ω, the parallel combined impedance will be 50Ω. In this case, if the current output amplitude of the differential transmission circuit 211 is set to 4 mA and the current output amplitude of the differential transmission circuit 236 is set to 2 mA, the voltage amplitude of the differential transmission circuit 211 will be 400 mVppd and the voltage amplitude of the differential transmission circuit 236 will be 200 mVppd. That is, the amplitude of the second transmission signal will be half the amplitude of the first transmission signal.

The first transmission signal transmitted from the master module 21 and the second transmission signal transmitted from the slave module 23 are superimposed in the transmission line 22. The superimposed signal received by the master module 21 is input to the multilevel differential reception circuit 213. On the other hand, the superimposed signal received by the slave module 23 is input to the two-level differential reception circuit 232.

When the superimposed signal is received at the master module 21, the multilevel differential reception circuit 213 performs 4-level determination on the voltage amplitude of the superimposed signal by using three threshold values (for example, −200 mV, 0V and +200 mV). For example, if the voltage amplitude of the superimposed signal is smaller than −200 mV, the multilevel differential reception circuit 213 outputs data 0 that corresponds to a case where the voltage amplitude of the second transmission signal is −100 mV. Also, if the voltage amplitude of the superimposed signal is larger than +200 mV, the multilevel differential reception circuit 213 outputs data 1 that corresponds to a case where the voltage amplitude of the second transmission signal is +100 mV.

Furthermore, if the voltage amplitude of the superimposed signal is larger than −200 mV and smaller than 0V, the multilevel differential reception circuit 213 outputs data 0 that corresponds to a case where the voltage amplitude of the second transmission signal is −100 mV. Furthermore, if the voltage amplitude of the superimposed signal is smaller than +200 mV and larger than 0V, the multilevel differential reception circuit 213 outputs data 0 that corresponds to a case where the voltage amplitude of the second transmission signal is −100 mV. The data output in this manner is input to the latch circuit 214. A clock input from a CLK input (input terminal for clock) is also input to the latch circuit 214. Then, the data input to the latch circuit 214 is output to an RX output (output terminal for received data) in synchronization with the transition timing of the clock.

On the other hand, when the superimposed signal is received at the slave module 23, the two-level differential reception circuit 232 performs 2-level determination on the voltage amplitude of the superimposed signal by using one threshold value (for example, 0V). For example, if the voltage amplitude of the superimposed signal is larger than 0V, the two-level differential reception circuit 232 outputs data 1 that corresponds to a case where the voltage amplitude of the first transmission signal is +200 mV. Furthermore, if the voltage amplitude of the superimposed signal is smaller than 0V, the two-level differential reception circuit 232 outputs data 0 that corresponds to a case where the voltage amplitude of the first transmission signal is −200 mV. Then, the data output from the two-level differential reception circuit 232 is input to the CDR circuit 233. The CDR circuit 233 extracts a clock based on the transition timing of the data input from the two-level differential reception circuit 232. Also, the CDR circuit 233 outputs the data input from the two-level differential reception circuit 232 to an RX output (output terminal for received data).

The clock extracted by the CDR circuit 233 is output to a CLK output (output terminal for clock) while also being input to the timing adjustment circuit 234. When the clock is input, the timing adjustment circuit 234 adjusts the transition timing by a delay time TD of transmission delay occurring in the transmission line 22, and inputs the clock after adjustment to the latch circuit 235. The latch circuit 235 outputs transmission data input from a TX input (input terminal for transmission data) in synchronization with the transition timing of the clock input from the timing adjustment circuit 234. The transmission data output from the latch circuit 235 is input to the differential transmission circuit 236 and is transmitted to the master module 21. With reference to FIG. 8, the delay time detection unit 237 detects, from a difference between a transition timing of a second transmission signal transmitted from the slave module 23 and a transition timing of the first transmission signal, a delay time occurring at a time of transmitting one of the first transmission signal or the second transmission signal through the predetermined transmission path. The delay time notification unit 238 notifies the slave module 23 of the delay time detected by the delay time detection unit.

In the foregoing, a module configuration of the full-duplex bidirectional transmission system has been described.

[2-2: Influence of Transmission Delay]

Next, influence of transmission delay occurring in the transmission line 22 will be described. Here, influence of transmission delay occurring in the transmission line 22 in a case the transition timing of a clock was not adjusted by the timing adjustment circuit 234 will be considered with reference to FIGS. 11 to 13.

The first transmission signal and the second transmission signal transmitted at a certain timing are superimposed in the transmission line 22. As described, since transmission delay occurs in the transmission line 22, the superimposed signal observed at an end part of the transmission line 22 on the side of the master module (hereinafter, receiving end of the master module 21) will have a signal waveform as shown in FIG. 11.

Figure 11:
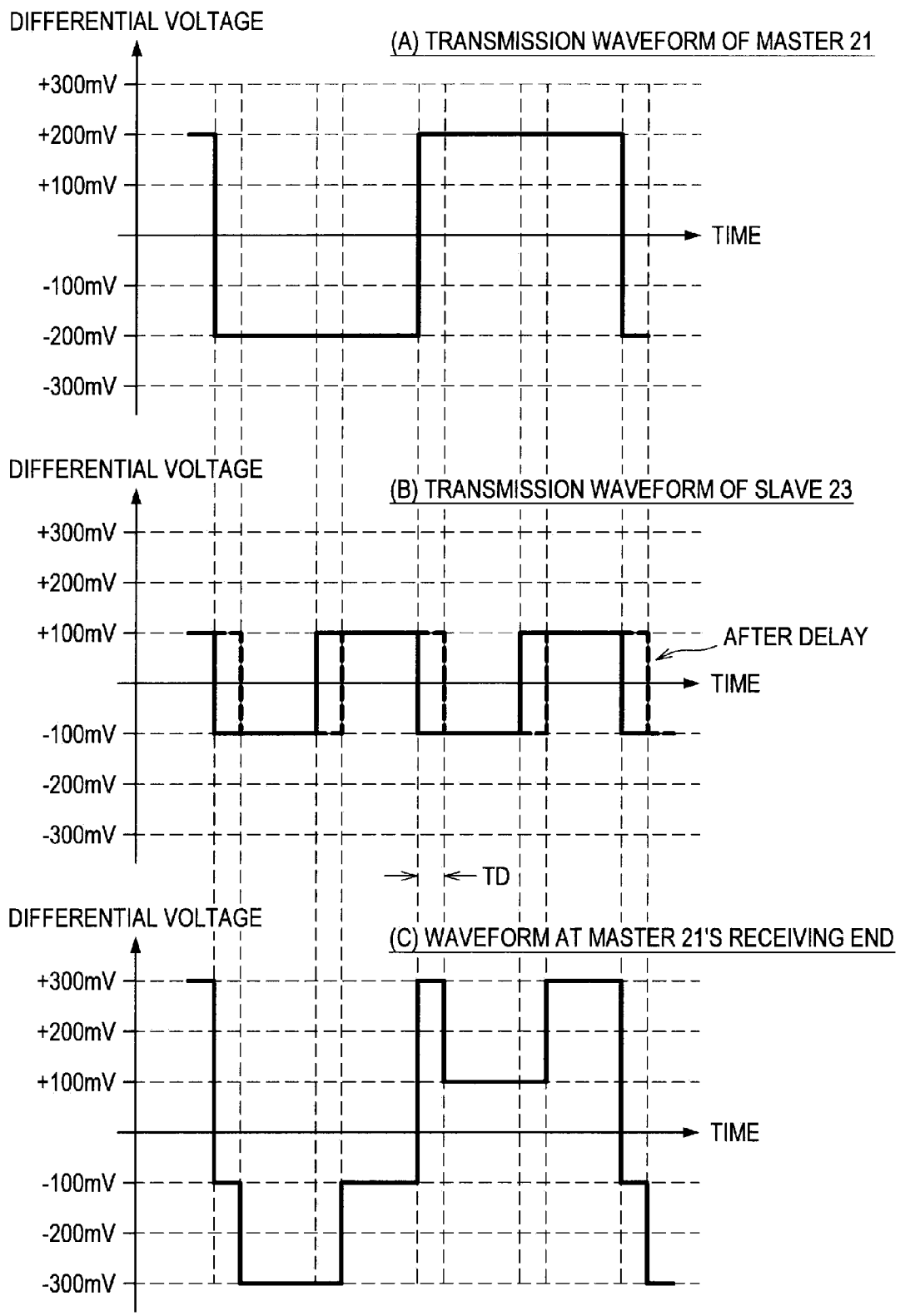
FIG. 11 is an explanatory diagram for describing a waveform of a signal received by the master module in a case where transmission delay is not taken into account.

FIG. 11 shows a voltage waveform (A) of the first transmission signal transmitted from the master module 21, a voltage waveform (B) of the second transmission signal transmitted from the slave module 23 and a voltage waveform (C) observed at the receiving end of the master module 21. As shown in (B), transmission delay of delay time TD occurs in the transmission line 22 for the second transmission signal before the second transmission signal reaches the receiving end of the master module 21. Accordingly, the voltage waveform (C) observed at the receiving end of the master module 21 will be a combined waveform of the voltage waveform (A) and a voltage waveform including the delay of delay time TD (broken line of (B)).

Figure 12:
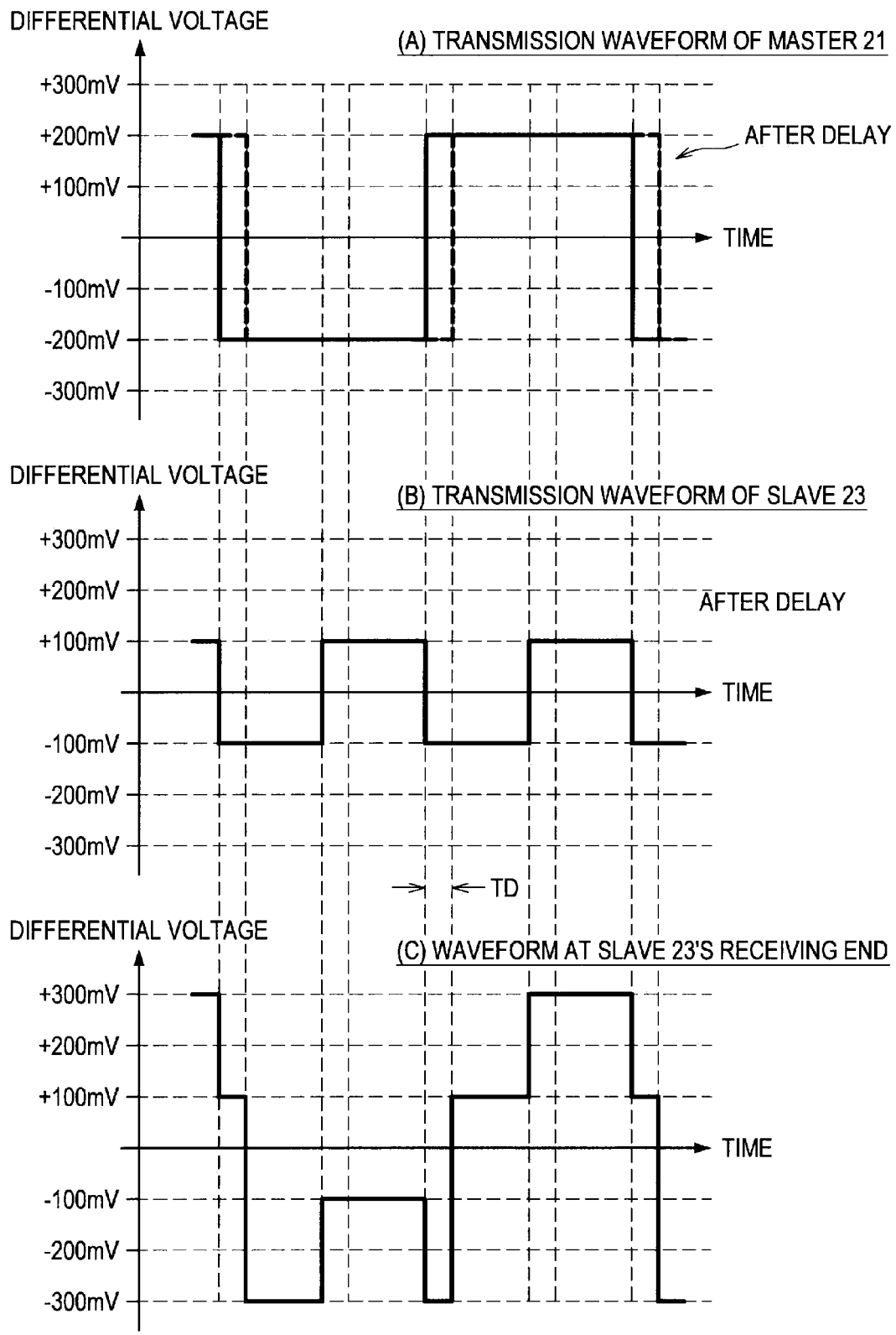
FIG. 12 is an explanatory diagram for describing a waveform of a signal received by the slave module in a case where transmission delay is not taken into account.

Similarly, the superimposed signal observed at an end part of the transmission line 22 on the side of the slave module 23 (hereinafter, receiving end of the slave module 23) will have a signal waveform as shown in FIG. 12.

FIG. 12 shows a voltage waveform (A) of the first transmission signal transmitted from the master module 21, a voltage waveform (B) of the second transmission signal transmitted from the slave module 23 and a voltage waveform (C) observed at the receiving end of the slave module 23. As shown in (A), transmission delay of delay time TD occurs in the transmission line 22 for the first transmission signal before the first transmission signal reaches the receiving end of the slave module 23. Accordingly, the voltage waveform (C) observed at the receiving end of the slave module 23 will be a combined waveform of a voltage waveform including the delay of delay time TD (broken line of (A)) and the voltage waveform (B).

Figure 13:
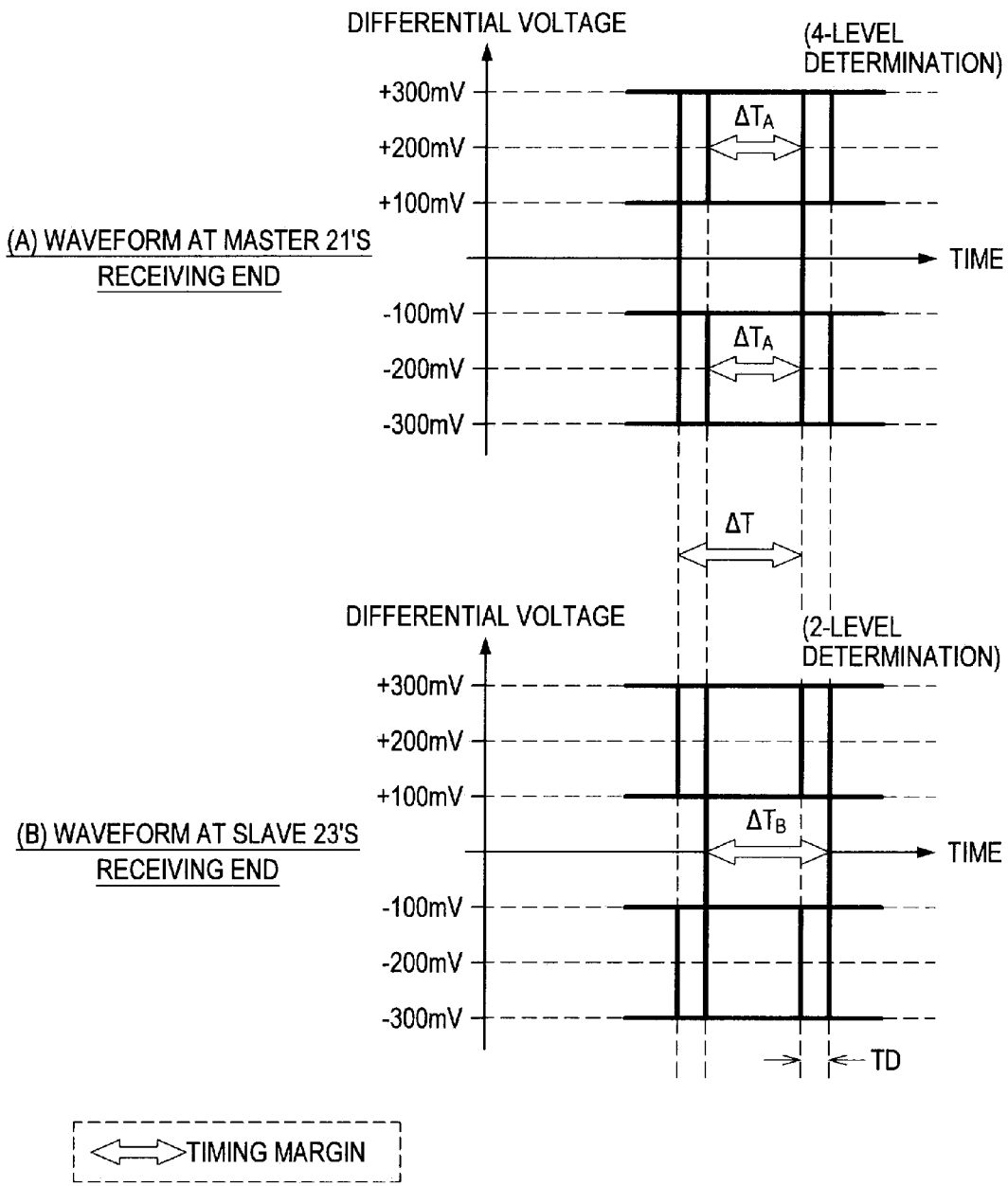
FIG. 13 is an explanatory diagram for describing eye patterns observed at the receiving end of both modules in a case where transmission delay is not taken into account.

The eye pattern of the voltage waveform observed at the receiving end of the master module 21 ((C) of FIG. 11) and the eye pattern of the voltage waveform observed at the receiving end of the slave module 23 ((C) of FIG. 12) will have shapes as shown in FIG. 13. FIG. 13(A) shows the eye pattern of the voltage waveform observed at the receiving end of the master module 21. On the other hand, FIG. 13(B) shows the eye pattern of the voltage waveform observed at the receiving end of the slave module 23.

As has been described, the voltage amplitude of the second transmission signal (±100 mV in the example of FIG. 11) is half the voltage amplitude of the first transmission signal (±200 mV in the example of FIG. 12). Thus, the multilevel differential reception circuit 213 of the master module 21 has to perform, for the voltage amplitude of the voltage waveform observed at the receiving end of the master module 21, threshold determination for four levels by using three threshold values (+200 mV, 0V and −200 mV in the example of FIG. 13). In this case, as shown in FIG. 13(A), the timing margin of the eye pattern (A) at the threshold ±200 mV is $\Delta T_A$. As can be seen from FIG. 13(A), the timing margin $\Delta T_A$ is reduced to the extent of delay time TD compared to the timing margin $\Delta T$ of a case where there is no transmission delay.

On the other hand, the two-level differential reception circuit 232 of the slave module 23 has only to perform two-level determination on the voltage waveform observed at the receiving end of the slave module 23 by using one threshold value (0V in the example of FIG. 13). Accordingly, as shown in FIG. 13(B), the timing margin of the eye pattern (B) at the threshold 0V is $\Delta T_B$ and is equal to the timing margin $\Delta T$ of a case where there is no transmission delay. That is, no influence of transmission delay is exerted on the receiving side of the transmission signal with a large voltage amplitude (the first transmission signal). For this reason, in the full-duplex bidirectional transmission system, a mechanism becomes necessary, on the receiving side of the transmission signal with a small voltage amplitude (the second transmission signal), of preventing reduction in the timing margin caused due to the influence of transmission delay.

[2-3: Mechanism for Avoiding Influence of Transmission Delay]

To realize the mechanism mentioned above, the slave module 23 according to the present embodiment is provided with the timing adjustment circuit 234. Here, a consequence and effect obtained by adjusting the transition timing of a clock by the timing adjustment circuit 234 will be described with reference to FIGS. 14 to 16.

Figure 14:
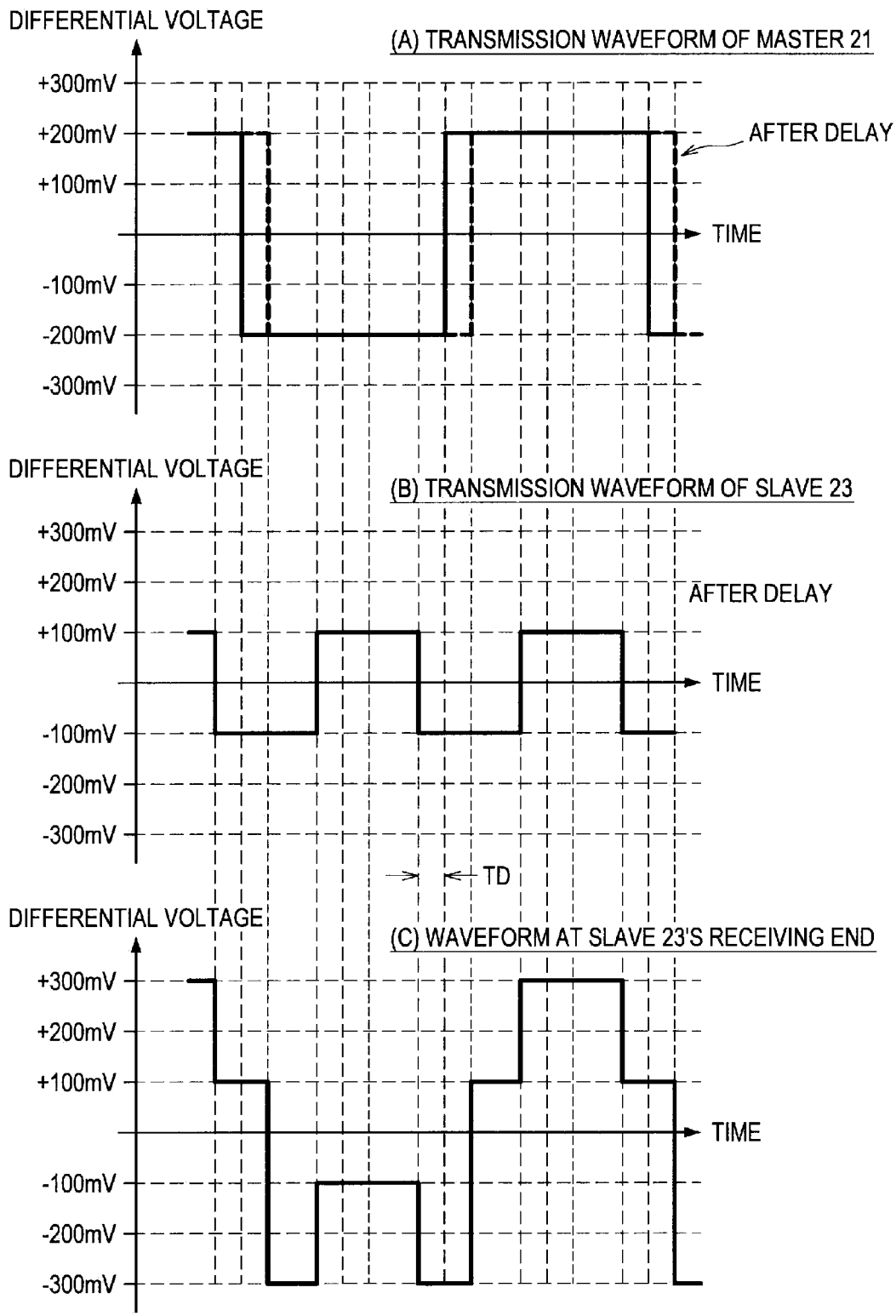
FIG. 14 is an explanatory diagram for describing a waveform of a signal received by the master module in a case where transmission delay is taken into account.

First, FIG. 14 will be referred to. FIG. 14 shows a voltage waveform (A) of the first transmission signal transmitted from the master module 21, a voltage waveform (B) of the second transmission signal transmitted from the slave module 23 and a voltage waveform (C) observed at the receiving end of the slave module 23. As shown in (A), transmission delay of delay time TD occurs in the transmission line 22 for the first transmission signal before the first transmission signal reaches the receiving end of the slave module 23. Accordingly, the voltage waveform (C) observed at the receiving end of the slave module 23 will be a combined waveform of a voltage waveform including the delay of delay time TD (broken line of (A)) and the voltage waveform (B).

Additionally, the second transmission signal transmitted from the slave module 23 is transmitted in synchronization with a clock whose transition timing is adjusted by the amount of delay time TD by the timing adjustment circuit 234. Accordingly, the voltage waveform (C) observed at the receiving end of the slave module 23 will have a more complicated form than the voltage waveform (C) shown in FIG. 12. However, regardless of the transition timing of the second transmission signal, the amplitude of the voltage waveform (C) will be larger than 0V when the voltage amplitude of the first transmission signal is +200 mV, and the amplitude of the voltage waveform (C) will be smaller than 0V when the voltage amplitude of the first transmission signal is −200 mV. Accordingly, no influence will be exerted by the complexity of the voltage waveform (C) at the time of determining the voltage amplitude of the first transmission signal from the voltage waveform (C).

Figure 15:
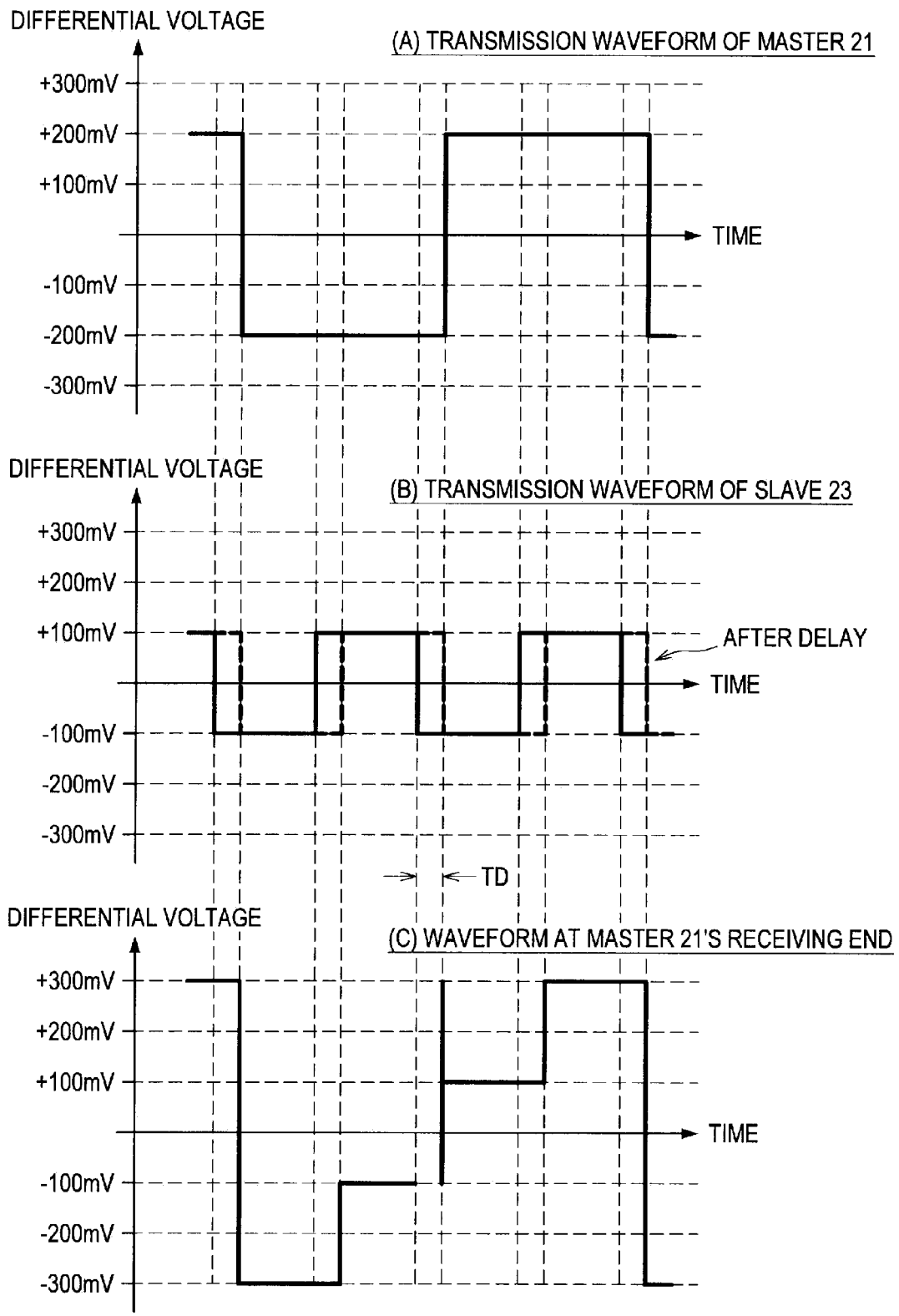
FIG. 15 is an explanatory diagram for describing a waveform of a signal received by the slave module in a case where transmission delay is taken into account.
Figure 16:
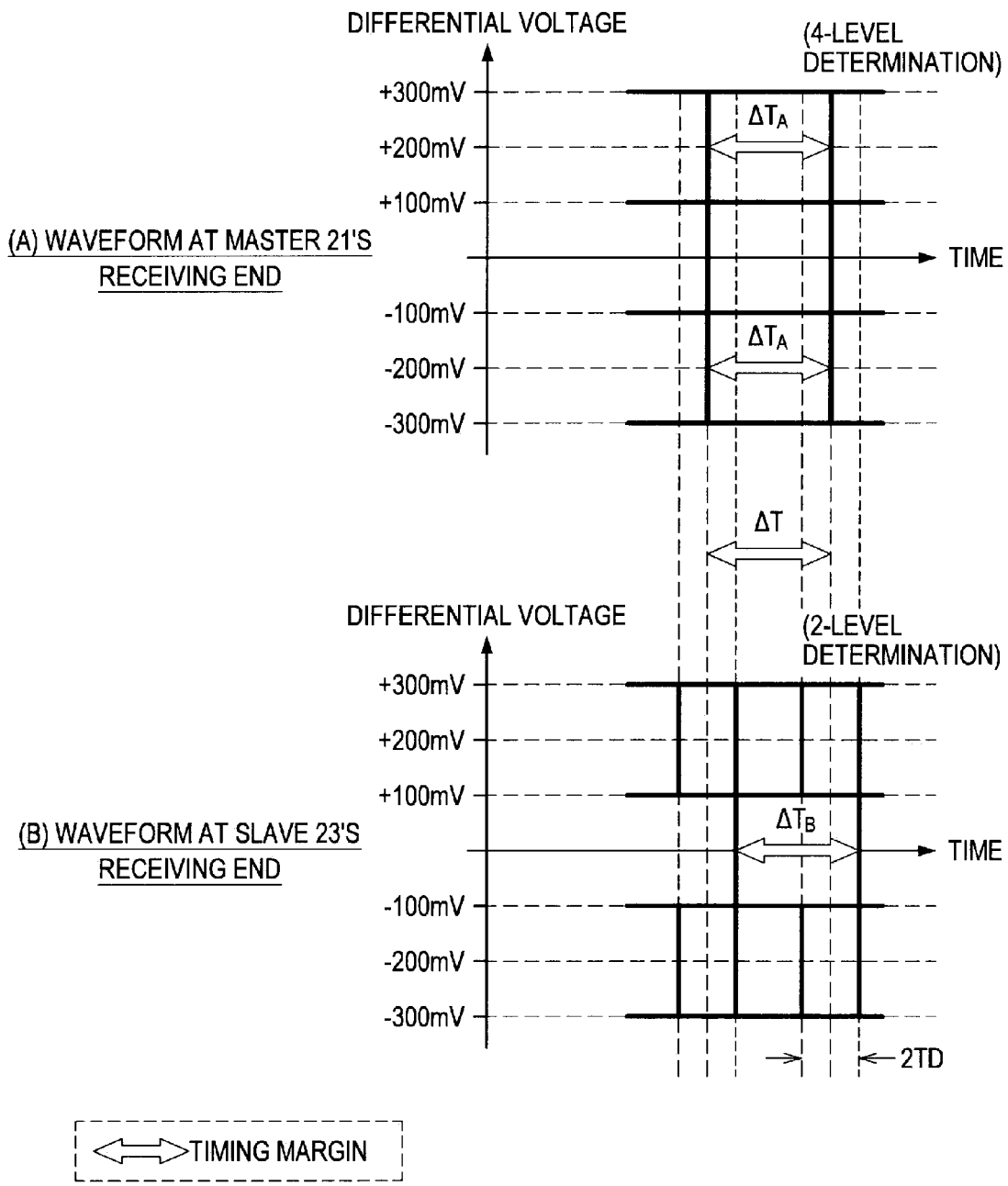
FIG. 16 is an explanatory diagram for describing eye patterns observed at the receiving ends of both modules in a case where transmission delay is taken into account.

Next, FIG. 15 will be referred to. FIG. 15 shows a voltage waveform (A) of the first transmission signal transmitted from the master module 21, a voltage waveform (B) of the second transmission signal transmitted from the slave module 23 and a voltage waveform (C) observed at the receiving end of the master module 21. As shown in (A), transmission delay of delay time TD occurs in the transmission line 22 for the second transmission signal before the second transmission signal reaches the receiving end of the master module 21. Accordingly, the voltage waveform (C) observed at the receiving end of the master module 21 will be a combined waveform of a voltage waveform including the delay of delay time TD (broken line of (A)) and the voltage waveform (B).

Additionally, the second transmission signal transmitted from the slave module 23 is transmitted in synchronization with a clock whose transition timing is adjusted by the amount of delay time TD by the timing adjustment circuit 234. Accordingly, the voltage waveform (C) observed at the receiving end of the master module 21 is equal to a combined waveform obtained by combining the first transmission signal and the second transmission signal whose transition timings have been aligned. That is, with the transition timing of the clock adjusted by the timing adjustment circuit 234, the voltage waveform (C) observed at the receiving end of the master module 21 becomes equal to the voltage waveform of a superimposed signal which would be observed in a case where there is no transmission delay.

The eye pattern of the voltage waveform (C) shown in FIG. 14 observed at the receiving end of the slave module 23 will be as shown in FIG. 16(B). Also, the eye pattern of the voltage waveform (C) shown in FIG. 15 observed at the receiving end of the master module 21 will be as shown in FIG. 16(A).

As shown in FIG. 16(A), with the transition timing of the clock adjusted by the timing adjustment circuit 234, the timing margin $\Delta T_A$ of the voltage waveform observed at the receiving end of the master module 21 becomes equal to the timing margin $\Delta T$ which would be observed in a case where there is no transmission delay. On the other hand, as shown in FIG. 16(B), the timing margin $\Delta T_B$ of the voltage waveform observed at the receiving end of the slave module 23 will not change even if the transition timing of the clock is adjusted by the timing adjustment circuit 234 and will be equal to the timing margin $\Delta T$ which would be observed in a case where there is no transmission delay.

As described, influence of the transmission delay can be avoided by adjusting the transition timing of the clock by the timing adjustment circuit 234. That is, because the timing margin is not reduced, reduction in the reproduction accuracy of received data caused due to the transmission delay can be prevented.

[2-4: Supplement]

Now, it is preferable that adjustment of a transmission timing (transition timing of clock) by the timing adjustment circuit 234 can be automatically performed by some kind of feedback control circuit. To realize such a mechanism of feedback, it is necessary to provide a packet communication structure for exchanging packets including control signals and data between the master module 21 and the slave module 23, for example.

Furthermore, it is necessary to provide a timing detection structure for detecting the difference between the transition timing of the second transmission signal transmitted from the slave module 23 and the transition timing of the first transmission signal transmitted from the master module 21. Also, it is necessary to provide a result notification structure for notifying the detection result of the timing detection structure from the master module 21 to the slave module 23.

Furthermore, a training period is provided at the start of communication between the master module 21 and the slave module 23 to enable adjustment by the timing adjustment circuit 234. For example, training signals determined in advance are transmitted from the slave module 23 to the master module 21 while successively adjusting the transition timings of a clock by the timing adjustment circuit 234, and at the same time, the master module 21 sequentially scans the transmission timings. Then, the master module 21 performs expectation value check based on the scan result, and when coincidence is confirmed, the master module 21 notifies the slave module 23 to the effect. The slave module 23 which has received the notification adopts the adjustment value of the timing adjustment circuit 234 according to which the transmission timing will be one for which coincidence has been confirmed. Additionally, in a case a plurality of such transmission timings have been detected, an adjustment value that takes their centre value as the transmission timing is adopted.

<3: Summary>

Lastly, the technical contents according to the embodiment of the present disclosure will be briefly described. The technical contents stated here can be applied to a personal computer, a mobile phone, a portable game machine, a portable information terminal, an information appliance, a car navigation system or the like, for example.

As described above, the present embodiment relates to a full-duplex bidirectional transmission system that multiplexes two transmission signals with different amplitudes in a transmission line and transmits the same. For example, the amplitude ratio between the transmission signals input from both ends of the transmission line is set to 2 or more. Furthermore, this full-duplex bidirectional transmission system is configured from two modules each connected to one end of the transmission line, and a timing adjustment section for adjusting the output timing of a transmission signal is provided in at least one of the modules. This timing adjustment section adjusts the output timing of a transmission signal so that the transition timings of both transmission signals will coincide at the receiving end of the module outputting a transmission signal with large amplitude. That is, the timing adjustment section adjusts the output timing of one or both of the transmission signals so that the transition timing of the transmission signal with large amplitude and the transition timing of the transmission signal propagated through the transmission line (delayed signal) coincide with each other.

When the output timing of a transmission signal is adjusted in this manner, it becomes possible to accurately determine the amplitude of each transmission signal from a multilevel signal which has been multiplexed in the transmission line. Particularly, multilevel determination will be necessary at the module transmitting a transmission signal with large amplitude, but since timing adjustment described above is performed, multilevel determination of the amplitude can be performed with sufficient timing margin. As a result, the reproduction accuracy of received data is increased.

(Notes)

The master module 21 is an example of a first communication module. The slave module 23 is an example of a second communication module. The transmission line 22 is an example of a predetermined transmission path. The differential transmission circuit 211 is an example of a first signal transmission unit and a signal generation unit. The differential transmission circuit 236 is an example of a second signal transmission unit. The timing adjustment circuit 234 and the latch circuit 235 are examples of a transmission timing adjustment unit. The CDR circuit 233 is an example of a clock extraction unit. The baseband processor P24 is an example of an arithmetic processing unit. The liquid crystal unit P30 is an example of a display unit.

It should be understood by those skilled in the art that various modifications, combinations, sub-combinations and alterations may occur depending on design requirements and other factors insofar as they are within the scope of the appended claims or the equivalents thereof.

For example, the timing adjustment circuit 234 and the CDR circuit 233 are shown in FIG. 8 as separate bodies, but the function of the timing adjustment circuit 234 may also be embedded in the CDR circuit 233. Specifically, by making the oscillator of the CDR circuit 233 a multiphase oscillator and selecting an optimal phase from a plurality of phases, the CDR circuit 233 can realize the function of the timing adjustment circuit 234.

For example, a clock superimposed code such as a 8B10B may be used at the time of transmitting data from the master module 21 to the slave module 23. Additionally, the 8B10B code is a code formed to include transition from 0 to 1 or 1 to 0 with an appropriate frequency so that data values (0 or 1) forming the transmission data will not take the same value consecutively. A signal waveform generated based on such code will be a waveform of a signal that is obtained by superimposing a transmission signal that takes the data value of the transmission data as the amplitude with a clock with amplitude larger than that of the transmission signal. Additionally, as an example of the clock superimposed code, there is the multilevel code described in JP 2009-267624A. When using this multilevel code, a clock can be extracted without providing a PLL circuit or the like on the receiving side.

The present disclosure contains subject matter related to that disclosed in Japanese Priority Patent Application JP 2010-182998 filed in the Japan Patent Office on Aug. 18, 2010, the entire content of which is hereby incorporated by reference.

What is claimed is:

1. A signal transmission device comprising:
a first communication module comprising:
  a first signal transmission unit configured to transmit a first transmission signal having a first amplitude to a second communication module through a predetermined transmission path,
  wherein the second communication module comprises a second signal transmission unit configured to transmit a second transmission signal having a second amplitude different from the first amplitude to the first communication module through the predetermined transmission path; and
  a delay time detection unit configured to detect, from a difference between a transition timing of the second transmission signal transmitted from the second communication module and a transition timing of the first transmission signal, a delay time occurring at a time of transmitting one of the first transmission signal or the second transmission signal through the predetermined transmission path,
  wherein the second communication module comprises a transmission timing adjustment unit configured to adjust a transmission timing of the second transmission signal by the second signal transmission unit based on the delay time so that the transition timing of the first transmission signal and the transition timing of the second transmission signal coincide with each other at a receiving end of the first communication module.

2. The signal transmission device according to claim 1, wherein the transmission timing adjustment unit adjusts the transmission timing of the second transmission signal in synchronization with a clock signal whose transmission time is adjusted by the delay time.

3. The signal transmission device according to claim 1, wherein the first communication module comprises:
a signal generation unit configured to generate the first transmission signal having a waveform obtained by superimposing a clock signal on a data signal generated from transmission data; and
wherein the second communication module comprises:
a clock extraction unit configured to extract the clock signal from the first transmission signal transmitted from the first communication module, and wherein the second signal transmission unit transmits the second transmission signal by using the clock signal extracted by the clock extraction unit.

4. The signal transmission device according to claim 1, wherein the second amplitude of the second transmission signal is smaller than the first amplitude of the first transmission signal.

5. The signal transmission device according to claim 1, wherein the first communication module comprises:
a delay time notification unit configured to notify the second communication module of the delay time detected by the delay time detection unit, and wherein the transmission timing adjustment unit adjusts the transmission timing of the second transmission signal based on the delay time notified by the delay time notification unit.

6. The signal transmission device according to claim 1, wherein the second communication module comprises a training signal transmission unit configured to transmit a known training signal to the first communication module through the predetermined transmission path, and wherein the delay time detection unit detects the delay time occurring at the time of transmitting a signal through the predetermined transmission path, by scanning transmission timings of the known training signal transmitted by the training signal transmission unit.

7. The signal transmission device according to claim 1, further comprising:
an arithmetic processing unit configured to output image data; and a display unit configured to display the image data,
wherein the first signal transmission unit transmits, to the second communication module, the first transmission signal obtained by modulating the image data output from the arithmetic processing unit, and
wherein the display unit displays the image data obtained by demodulating the first transmission signal transmitted from the first communication module to the second communication module through the predetermined transmission path.

8. A transmission control method comprising:
transmitting, by a first communication module, a first transmission signal having a first amplitude to a second communication module through a predetermined transmission path;
receiving, from the second communication module, a second transmission signal having second amplitude different from the first amplitude to the first communication module through the predetermined transmission path,
detecting, from a difference between a transition timing of the second transmission signal received from the second communication module and a transition timing of the first transmission signal, a delay time occurring at a time of transmitting one of the first transmission signal or the second transmission signal through the predetermined transmission path,
wherein the second communication module adjusts a transmission timing of the second transmission signal based on the delay time so that the transition timing of the first transmission signal transmitted from the first communication module and the transition timing of the second transmission signal coincide with each other at a receiving end of the first communication module.

9. The transmission control method according to claim 8, further comprising transmitting the second transmission signal, from the second communication module, in synchronization with a clock signal whose transmission time is adjusted by the delay time.

10. The transmission control method according to claim 8, further comprising transmitting a known training signal to the first communication module through the predetermined transmission path.

11. The transmission control method according to claim 10, further comprising detecting the delay time occurring at the time of transmitting a signal through the predetermined transmission path, by scanning transmission timings of the known training signal.

12. The transmission control method according to claim 10, further comprising notifying the second communication module of the delay time and adjusting the transmission timing of the second transmission signal based on the notified delay time.

13. A signal transmission device comprising:
a first communication module comprising:
a signal generation unit configured to generate a first transmission signal having a waveform obtained by superimposing a clock signal on a data signal generated from transmission data;
a first signal transmission unit configured to transmit the first transmission signal having a first amplitude to a second communication module through a predetermined transmission path;
a delay time detection unit configured to detect, from a difference between a transition timing of a second transmission signal transmitted from a second communication module and a transition timing of the first transmission signal, a delay time occurring at a time of transmitting one of the first transmission signal or the second transmission signal through the predetermined transmission path; and
a delay time notification unit configured to notify the second communication module of the delay time detected by the delay time detection unit; and
the second communication module comprising:
a second signal transmission unit configured to transmit the second transmission signal having a second amplitude different from the first amplitude to the first communication module through the predetermined transmission path, wherein the second amplitude of the second transmission signal is smaller than the first amplitude of the first transmission signal;
a clock extraction unit configured to extract the clock signal from the first transmission signal transmitted from the first communication module, wherein the second signal transmission unit transmits the second transmission signal by using the clock signal extracted by the clock extraction unit;
a transmission timing adjustment unit configured to adjust the transmission timing of the second transmission signal based on the delay time so that the transition timing of the first transmission signal transmitted from the first communication module and the transition timing of the second transmission signal coincide with each other at a receiving end of the first communication module, wherein the transmission timing adjustment unit adjusts the transmission timing of the second transmission signal based on the delay time notified by the delay time notification unit,
wherein the transmission timing adjustment unit adjusts the transmission timing of the second transmission signal in synchronization with a clock signal whose transmission time is adjusted by the delay time.

* * * * *